(12) United States Patent
Wang et al.

(10) Patent No.: US 12,209,662 B2
(45) Date of Patent: Jan. 28, 2025

(54) SEAL, FLUID ASSEMBLY COMPRISING SAME, AND FLUID DEVICE

(71) Applicant: ZHEJIANG SANHUA AUTOMOTIVE COMPONENTS CO., LTD., Zhejiang (CN)

(72) Inventors: Lixin Wang, Zhejiang (CN); Yun Wang, Zhejiang (CN); Long Lin, Zhejiang (CN); Cancan Shen, Zhejiang (CN); Jianhua Chi, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 0 days.

(21) Appl. No.: 18/039,028

(22) PCT Filed: Dec. 30, 2021

(86) PCT No.: PCT/CN2021/142788
§ 371 (c)(1),
(2) Date: May 26, 2023

(87) PCT Pub. No.: WO2022/143852
PCT Pub. Date: Jul. 7, 2022

(65) Prior Publication Data
US 2024/0003421 A1    Jan. 4, 2024

(30) Foreign Application Priority Data

Dec. 31, 2020 (CN) .......................... 202011617899.3

(51) Int. Cl.
*F16J 15/02* (2006.01)
*F16J 15/06* (2006.01)
*F16J 15/10* (2006.01)

(52) U.S. Cl.
CPC ........... *F16J 15/025* (2013.01); *F16J 15/061* (2013.01); *F16J 15/104* (2013.01); *F16J 15/062* (2013.01)

(58) Field of Classification Search
CPC ........ F16J 15/025; F16J 15/061; F16J 15/062; F16J 15/104; F16J 2015/0856; F16J 2015/0862
See application file for complete search history.

(56) References Cited

U.S. PATENT DOCUMENTS 2,898,000 A * 8/1959 Hanny ................. F16J 15/0887
  285/341
5,306,023 A    4/1994 Udagawa
(Continued)

FOREIGN PATENT DOCUMENTS

CN    202065087 U    12/2011
CN    104169620 A    11/2014
(Continued)

OTHER PUBLICATIONS

International Search Report for PCT/CN2021/142788 mailed Mar. 2, 2022, ISA/CN.
(Continued)

*Primary Examiner* — Nicholas L Foster
(74) *Attorney, Agent, or Firm* — Yue (Robert) Xu; Apex Attorneys at Law, LLP

(57) ABSTRACT

A seal, a fluid assembly comprising same, and a fluid device. The seal comprises a body portion; first through holes are formed in the seal; the seal further has first sealing portions corresponding to the first through holes; there are at least two first through holes; each first sealing portion comprises a first extension portion and a second extension portion; the first extension portion and the second extension portion are located on opposite sides of the body portion; the first extension portion and the second extension portion extend (Continued)

from the body portion toward the first through holes; the distance between the first extension portion and the second extension portion is greater than the height of the body portion; and the first extension portion is a closed raised structure, and the second extension portion is also a closed raised structure.

18 Claims, 7 Drawing Sheets

(56) References Cited

U.S. PATENT DOCUMENTS

| | | | | |
|---|---|---|---|---|
| 5,590,888 | A * | 1/1997 | Brummer | F02M 35/10321 |
| | | | | 277/591 |
| 5,947,483 | A * | 9/1999 | Brummer | F16J 15/106 |
| | | | | 277/592 |
| 6,340,162 | B1 * | 1/2002 | Hobaugh, II | B62D 5/24 |
| | | | | 277/609 |
| 6,540,234 | B1 * | 4/2003 | Atkinson | F16J 15/0825 |
| | | | | 277/653 |
| 6,676,135 | B2 * | 1/2004 | Carey | F16J 15/061 |
| | | | | 277/596 |
| 7,070,187 | B2 * | 7/2006 | Boeve | F02F 11/002 |
| | | | | 277/630 |
| 7,150,292 | B2 * | 12/2006 | Roether | F16J 15/061 |
| | | | | 303/118.1 |
| 7,316,401 | B2 * | 1/2008 | Casler | F16J 15/126 |
| | | | | 277/630 |
| 9,528,466 | B2 * | 12/2016 | Swasey | F16J 15/0818 |
| 10,473,218 | B2 * | 11/2019 | Dore | H05K 5/061 |
| 11,460,109 | B2 * | 10/2022 | Makinae | F16J 15/127 |
| 2002/0063395 | A1 * | 5/2002 | Klinner | F16J 15/0818 |
| | | | | 277/592 |
| 2003/0201610 | A1 * | 10/2003 | Carey | F16J 15/061 |
| | | | | 277/590 |
| 2009/0014963 | A1 | 1/2009 | Fietz | |
| 2010/0013213 | A1 * | 1/2010 | Katsura | F16J 15/062 |
| | | | | 285/29 |
| 2010/0102519 | A1 | 4/2010 | Yoshitsune et al. | |
| 2011/0109049 | A1 * | 5/2011 | Prehn | F16J 15/0887 |
| | | | | 277/595 |
| 2012/0205877 | A1 * | 8/2012 | Schumacher | A63B 21/023 |
| | | | | 277/650 |
| 2013/0099451 | A1 | 4/2013 | Estes et al. | |
| 2013/0241156 | A1 * | 9/2013 | Munekata | F16J 15/0818 |
| | | | | 277/591 |
| 2016/0252046 | A1 * | 9/2016 | Swasey | F02F 11/002 |
| | | | | 277/595 |
| 2017/0097092 | A1 * | 4/2017 | Sabotta | F16J 15/123 |
| 2019/0107199 | A1 * | 4/2019 | Dore | F16J 15/061 |
| 2020/0141494 | A1 | 5/2020 | Sakaguchi et al. | |
| 2020/0386313 | A1 * | 12/2020 | Hwang | F16J 15/0818 |
| 2022/0341494 | A1 * | 10/2022 | Cheung | F16J 15/061 |
| 2023/0407968 | A1 * | 12/2023 | Prandoni Kistner | F16J 15/104 |
| 2024/0159321 | A1 * | 5/2024 | Wang | F16J 15/102 |

FOREIGN PATENT DOCUMENTS

| | | |
|---|---|---|
| DE | 8210590 U1 | 8/1982 |
| DE | 102011011103 A1 | 8/2012 |
| EP | 2837857 A1 | 2/2015 |
| JP | 2000-227167 A | 8/2000 |
| JP | 2002-339815 A | 11/2002 |
| JP | 2008249100 A | 10/2008 |
| JP | 2009209687 A | 9/2009 |
| JP | 2012002287 A | 1/2012 |
| WO | 2011/077596 A1 | 6/2011 |
| WO | 2020/039706 A1 | 2/2020 |

OTHER PUBLICATIONS

First Office Action dated Jun. 25, 2024 for Japanese patent application No. 2023-540545, English translation provided by Global Dossier.
The European Search Report issued on Oct. 21, 2024 for the European application No. 21914583.6.

* cited by examiner

SEAL, FLUID ASSEMBLY COMPRISING SAME, AND FLUID DEVICE

This disclosure is a national phase application of PCT international patent application PCT/CN2021/142788, filed on Dec. 30, 2021 which claims the benefit of the priority to Chinese Patent Application No. 202011617899.3, titled "SEAL, FLUID ASSEMBLY COMPRISING SAME, AND FLUID DEVICE", filed with the China National Intellectual Property Administration on Dec. 31, 2020, which are incorporated herein by reference in its entirety.

FIELD

The present disclosure relates to the technical field of sealing, in particular to a seal, a fluid assembly including the same, and a fluid device including the same.

BACKGROUND

A sealing component can be applied in a passage of a fluid control system. The sealing component is provided between two mounting surfaces, so as to prevent the fluid from leaking between the two mounting surfaces. In some disclosures of the sealing component, the mounting requirements for the sealing component are more complex when the sealing surface is large.

SUMMARY

An object according to the present disclosure is to provide a seal with good sealing performance under a relatively small pre-pressure when a sealing area is large, and a fluid assembly including the same and a fluid device including the same.

A seal is provided according to the present disclosure, which includes body portions, where first through holes are formed in the seal, where the seal further has first sealing portions corresponding to the first through holes, at least two first through holes are provided, and the at least two first through holes have the corresponding first sealing portions; each first sealing portion includes a first extension portion and a second extension portion, the first extension portion and the second extension portion extend from the body portion toward the corresponding first through hole, and a distance between the first extension portion and the second extension portion is greater than a height of the body portion; along a height direction of the body portion, the first extension portion forms a closed protruding structure around the first through hole at one end of the first through hole, and the second extension portion forms a closed protruding structure around the first through hole at the other end of the first through hole.

In the seal according to the present disclosure, the first extension portion and the second extension portion are located on two opposite sides of the body portion, the first extension portion and the second extension portion extend from the body portion toward the corresponding first through hole, and the distance between the first extension portion and the second extension portion is greater than the height of the body portion, which can have good sealing performance under a relatively small pre-pressure when a sealing area is large.

A fluid device is further provided according to the present disclosure, which includes a housing, where the housing includes a first body element, the housing has passages and accommodating grooves which surround the passages, and the above seal is provided in the accommodating grooves, the multiple through holes of the seal correspond to the multiple passages, and the first sealing portion surrounds the corresponding passage.

In the fluid device according to the present disclosure, the first extension portion and the second extension portion are located on two opposite sides of the body portion, the first extension portion and the second extension portion extend from the body portion toward the corresponding first through hole, and the distance between the first extension portion and the second extension portion is greater than the height of the body portion, which can have good sealing performance under a relatively small pre-pressure when a sealing area is large.

A fluid assembly is further provided according to the present disclosure, which includes a fluid device and a second body element, where the fluid device includes a housing; the housing further includes a first body element, the housing has passages and accommodating grooves which surround the passages, and the above seal is provided in the accommodating grooves; the at least two through holes of the seal correspond to the at least two passages, and the first sealing portion surrounds the corresponding passage; the first body element is fixed to the second body element, and the first body element and the second body element compress the seal tightly.

In the fluid device according to the present disclosure, the first extension portion and the second extension portion are located on two opposite sides of the body portion, the first extension portion and the second extension portion extend from the body portion toward the corresponding first through hole, and the distance between the first extension portion and the second extension portion is greater than the height of the body portion, which can have good sealing performance under a relatively small pre-pressure when a sealing area is large.

DETAILED DESCRIPTION OF THE EMBODIMENTS

Figure 1:
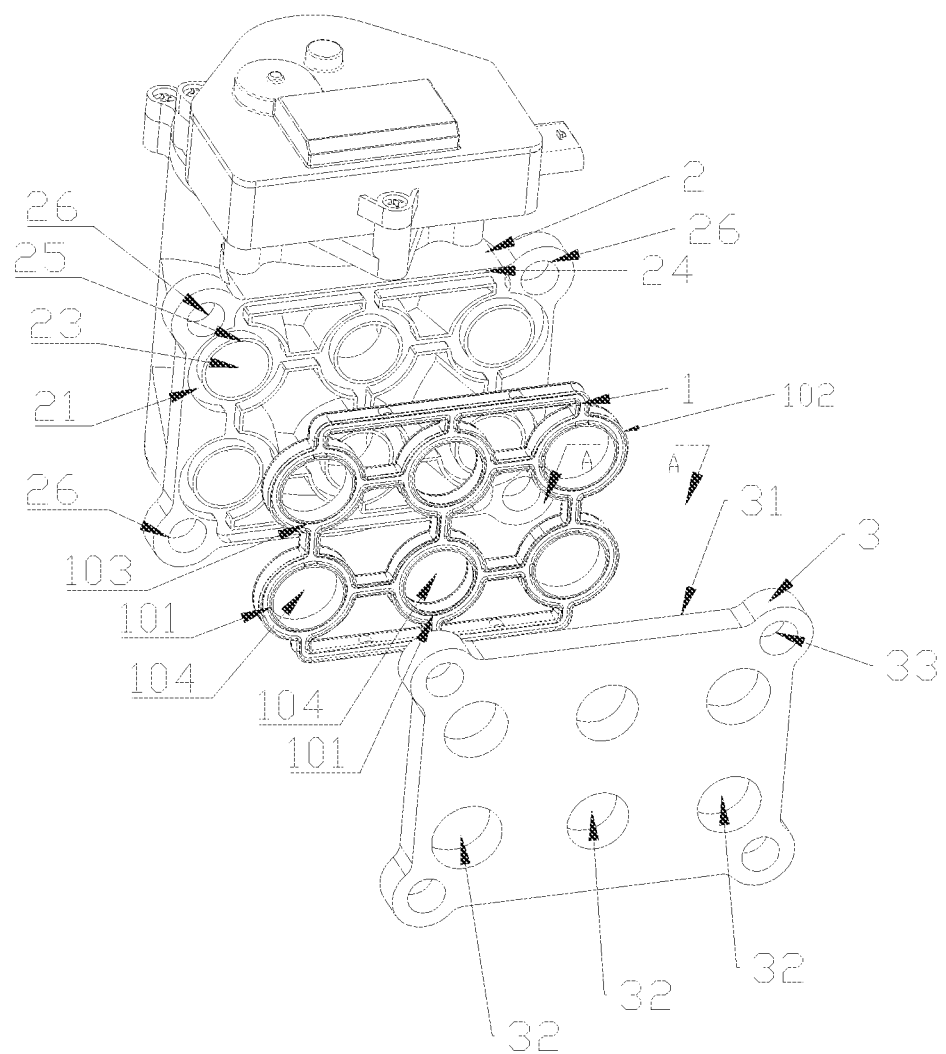
FIG. 1 is a schematic exploded view of a fluid assembly including a seal, a first body element and a second body element according to an embodiment of the present disclosure.

Embodiments are described in detail below with reference to the accompanying drawings.

Referring to FIG. 1 to FIG. 12, a fluid device includes a housing 4 and an inner cavity 41 that is located in the housing 4. The housing 4 further has a first body element 2. The housing further includes at least two passages 42, one end of each passage 42 is connected with one opening portion, the other end of each passage is connected with the inner cavity 41, and the opening portion is in communication with the inner cavity 41 through the corresponding passage 42. At least part of the opening portions of the valve can be connected to other parts of a fluid control system through the first body element 2, so that the mounting process can be relatively simplified and the sealing reliability can be improved. The fluid device is not limited to a valve, but may be other devices used in the fluid control system, such as a pump and a heat exchanger, or may be integrated components with multiple functions, such as an integrated assembly of the heat exchanger and the valve, an integrated assembly of the valve and the pump, and an integrated assembly of the pump and the heat exchanger.

The first body element 2 has a first mounting surface portion, and the first mounting surface portion has a mounting surface 24. The first body element 2 includes at least two opening portions 23, the first body element 2 further has accommodating grooves 21 which are recessed in the mounting surface 24, at least part of the seal 1 is arranged in the accommodating grooves 21, and each of the opening portions 23 is surrounded by the seal 1. The first body element 2 is plate-shaped, and the first body element 2 has first mounting holes 26 that extend through the first body element 2 along a thickness direction of the first body element 2, and the at least two first mounting holes 26 are located at an edge of the first mounting surface portion. In this embodiment, the fourth first mounting holes 26 are located at four corners of the first mounting surface portion, and the first mounting hole may not be provided in other areas (such as a central area) of the first mounting surface portion.

A second body element 3 corresponds to the first body element 2. The second body element 3 has a second mounting surface portion 31, the second body element 3 includes at least two interface portions 32, and the at least two interface portions 32 correspond to the at least two opening portions 23. The second body element 3 has second mounting holes 33 corresponding to the first mounting holes 26, the first body element 2 and the second body element 3 can be fixed by the first mounting holes 26 and the second mounting holes 33 with screws or bolts being there through. The seal 1 are compressed by the first body element 2 and the second body element 3 tightly, so that fluid seal is provided among the opening portions 23. A body portion of the first body element 2 may be made of an organic polymer material, such as plastic or metal.

Figure 2:
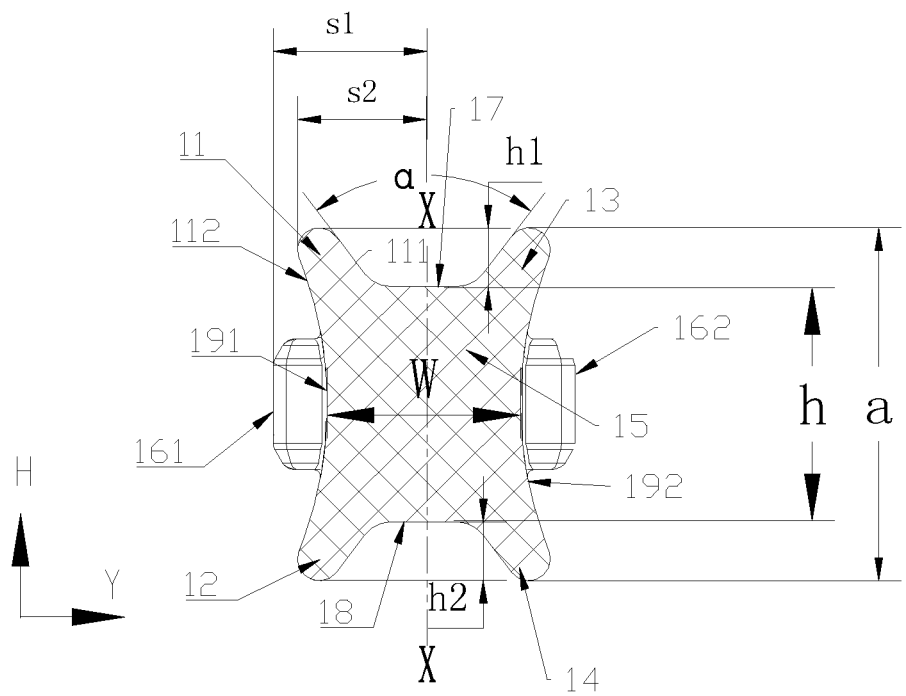
FIG. 2 is a partially schematic cross-sectional view of the seal shown in FIG. 1.

As shown in FIG. 1 and FIG. 2, at least two first through holes 104 are formed in the seal 1, and the seal further has first sealing portions 101 corresponding to the first through holes 104. Each first sealing portion 101 includes a first extension portion 11 and a second extension portion 12, and at least two first sealing portions 101 are accordingly provided. The first extension portion 11 surrounds and forms part of the first through hole 104, and the second extension portion 12 also surrounds and forms part of the first through hole 104. In this embodiment, along a height direction of the first sealing portion 101, the first extension portion 11 forms a closed protruding structure around the first through hole 104 at one end of the first through hole 104, and the second extension portion 12 forms a closed protruding structure around the first through hole 104 at the other end of the first through hole 104. The seal 1 further includes second sealing portions 102 on an outer circumferential side of the seal 1, and each second sealing portion 102 is located on an outer circumferential side the first sealing portion 101. Each second sealing portion 102 includes a third extension portion 13 and a fourth extension portion 14. In this embodiment, the first sealing portion 101 and the second sealing portion 102 are connected by a body portion 15. In other embodiments, the first sealing portion 101 and the second sealing portion 102 may be separately arranged.

H is defined as a vertical direction or vertically, Y is defined as a transverse direction or transversely, and the relationship between the vertical direction and the transverse direction is perpendicular or substantially perpendicular. As shown in a cross section of the seal 1, the seal 1 includes the body portion 15, the first extension portion 11, the second extension portion 12, the third extension portion 13 and the fourth extension portion 14. The first extension portion 11 and the second extension portion 12 are located on vertically opposite sides of the body portion 15, and the third extension portion 13 and the fourth extension portion 14 are located on vertically opposite sides of the body portion 15. The first extension portion 11, the second extension portion 12, the third extension portion 13 and the fourth extension portion 14 extend away from the body portion. In this embodiment, a cross section of the body portion 15 is substantially rectangular, the first extension portion 11, the second extension portion 12, the third extension portion 13 and the fourth extension portion 14 extend away from corresponding four corners of the body portion 15. The seal 1 further has a first inner wall 191 and an outer wall 192 that are transversely opposite. The first extension portion 11 and the second extension portion 12 extend from the body portion 15 toward the corresponding first through hole 104, and the first inner wall 191 of the seal 1 corresponds to the first through hole 104. A distance between the first extension portion 11 and the third extension portion 13 is greater than a width (W) of the body portion 15, a distance between the second extension portion 12 and the fourth extension portion 14 is greater than the width (W) of the body portion 15, a distance between the first extension portion 11 and the second extension portion 12 is greater than a height (h) of the body portion 15, and a distance between the third extension portion 13 and the fourth extension portion 14 is greater than the height (h) of the body portion 15 in the vertical direction. The first extension portion 11 and the third extension portion 13 are located on a same vertical side of the body portion 15, and a first groove 17 is formed between the first extension portion and the third extension portion. The second extension portion 12 and the fourth extension portion 14 are located on a same vertical side of the body portion 15, and a second groove 18 is formed between the second extension portion 12 and the fourth extension portion 14.

The first inner wall 191, the outer wall 192, the first extension portion 11, the second extension portion 12, the third extension portion 13 and the fourth extension portion 14 all correspondingly extend from the body portion 15, and the extending direction is perpendicular or substantially perpendicular to the direction of the cross section. It should be noted that, the first inner wall 191, the outer wall 192, the first extension portion 11, the second extension portion 12, the third extension portion 13 and the fourth extension portion 14 may vary along with the shape of the seal 1 or the mounting state of the seal 1.

As shown in FIG. 1, cross sections of the first extension portion 11, the second extension portion 12, the third extension portion 13 and the fourth extension portion 14 are substantially strip-shaped with one end connected with the body portion 15. The "strip-shaped" means that the length of the cross section is greater than the average thickness of the cross section, but not specifically refers to an elongated shape with parallel two sides. Cone, ellipse or other shapes that meet the definition can be included. The length of the cross section of each extension portion can be greater than 1.4 times the average thickness of the cross section, so that the strip-shaped extension portion is easier to bend. The portion, close to the body portion, of each extension portion is defined as a proximal end, and the portion, away from the body portion, of each extension portion is defined as a distal end.

As shown in FIG. 3 to FIG. 6, the first sealing portion 101 surrounds the opening portion 23, and projections of the opening portion 23 and the corresponding interface portion 32 on the second mounting surface portion 31 are within an area of a projection of the first through hole 104 on the second mounting surface portion 31. After the first body element 2 is fixed to the second body element 3, the first sealing portion 101 surrounds the interface portion 32 corresponding to the opening portion 23, and the first sealing portion 101 is in a compressed state, so that the opening portion 23 is in communication with and sealed to the interface portion 32.

Figure 7:
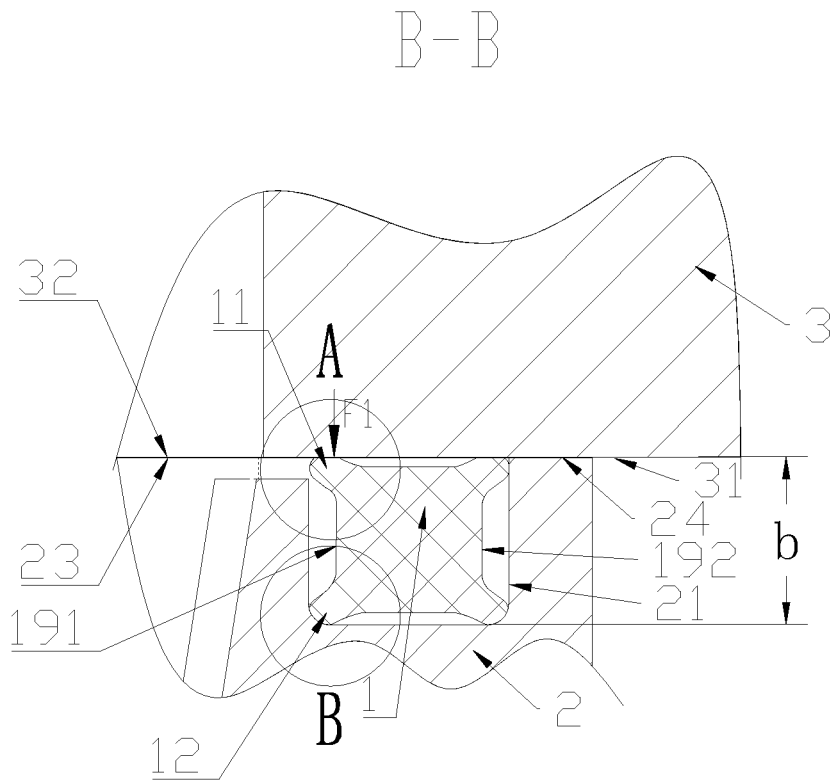
FIG. 7 is a partially schematic cross-sectional view of the seal, the second body element and the first body element shown in FIG. 3 in a mounted state taken along line B-B.

As shown in FIG. 2, in a case that the seal 1 is in an uncompressed state in the vertical direction, an overall height of the seal 1 in the vertical direction is a, a height of the first extension portion 11 in the vertical direction is h1, where the height h1 is a distance between a top end of the first extension portion 11 and the bottom of the first groove 17 in the vertical direction, and a height of the second extension portion 12 in the vertical direction is h2. The height h2 is a distance between a top end of the second extension portion 12 and the bottom of the second groove 18 in the vertical direction. As shown in FIG. 7, in a case that the seal 1 is in a mounted state, the overall height of the seal 1 in the vertical direction is b, and h1+h2≥a−b. Therefore, after mounting, the bottom of the first groove 17 may not be in contact with the second mounting surface portion 31, and the bottom of the second groove 18 may not be in contact with a bottom wall surface of the accommodating groove 21, so that the main deformation of the seal 1 occurs in the extension portions, and the deformation of the body portion 15 in the vertical direction is small. When the seal 1 according to the embodiment of the present disclosure is applied to a situation with a large sealing area, the extension portions are easier to deform compared with the body portion 15 by arranging the strength of the extension portions to be less than the strength of the body portion 15. Therefore, under the given compression ratio, such arrangement can relatively reduce the pre-pressure of the seal 1 on the second mounting surface portion 31 and the first body element 2, so as to prevent the pre-pressure of the seal 1 applied in some areas away from the fixed mounting point being insufficient, and meet the complex mounting requirements of the seal 1 in case that the sealing surface is large. The "pre-pressure" refers to a pressure in case that the mounting surface and the sealing component are not subject to fluid pressure.

In this embodiment, a value of a compression ratio (a−b)/a of the seal 1 ranges from 0.25 to 0.40, which can reduce the pre-pressure while meeting the sealing requirements. In addition, compared with the seal with a circular cross section of the same height and material, an upper limit of the compression rate that the seal in this embodiment can bear is relatively large, which can reach 0.4.

As shown in FIG. 1, the first body element 1 and the second body element 3 may be fixedly connected, at least two first mounting holes 26 are located close to an edge of the first mounting surface portion (located at four corners in this embodiment), and no first mounting hole 26 is provided in the central area of the first mounting surface portion. Since the first body element 2 has at least two opening portions 23 that are in array, the mounting surface 24 of the first mounting surface portion is relatively large. In an area away from the first mounting hole 26, the force of the first body element 2 in a direction perpendicular to the mounting surface 24 is relatively small, and the first body element 2 is easy to be in large deformation due to the pressure of the seal 1. Such deformation is particularly obvious when the thickness of the first body element 2 is small or the first body element 2 is made of plastic, which is likely to cause the seal 1 with a small deformation, and thus it exists a possibility of leakage.

In this embodiment, the pre-pressure of the seal 1 applied on the first body element 2 can be relatively small, so that the deformation of the mounting surface 24 of the first body element 2 is relatively small, and the distance between the mounting surface 24 and the second mounting surface portion 31 is relatively consistent. Therefore, the vertical compression of the whole seal 1 in a direction parallel to the mounting surface 24 is relatively uniform, thereby reducing the risk of sealing failure caused by insufficient compression of the seal 1 in some area. In addition, the required pre-tightening force between the first body element 2 and the second body element 3 can be reduced by reducing the pressure of the seal 1 on the first body element 2, which can simplify the fixed structure between the first body element 2 and the second body element 3.

In some embodiments, the seal 1 is made of elastic material and can be injection-molded from an organic polymer material. For example, the seal 1 can be made of one or a combination of Ethylene-Propylene-Diene Monomer (EPDM), silicone rubber and Poly tetra fluoroethylene (PTFE). The Shore hardness of EPDM is lower than the Shore hardness of silicone rubber, so that the compression ratio of EPDM in the vertical direction is greater under the same vertical pressure. As shown in FIG. 7, an overall size of the cross section of the seal 1 in a transverse direction can be adjusted according to a width of the accommodating groove 21, and the body portion 15 may not be in contact with an inner side wall of the accommodating groove 21.

As shown in FIG. 2, the first extension portion 11 has an inner side surface 111 and an outer side surface 112 that are respectively arranged on two transverse sides of the first extension portion 11, the outer side surface 112 of the first extension portion is part of the first inner wall 191, and the boundary between the inner side surface 111 and the outer side surface 112 of the first extension portion 11 is the distal end of the first extension part 11 in the vertical direction.

As shown in FIG. 2, FIG. 6, FIG. 7 and FIG. 7a, a contact surface between the second body element 3 and the seal 1 is perpendicular or substantially perpendicular to the vertical direction of the seal 1. During mounting, the distal end of the first extension portion 11 is in contact with the second mounting surface portion 31 of the second body element 3 just when the seal 1 is compressed, and the distal end of the first extension portion 11 is subjected to the force F1 of the second body element 3. A maximum widths of the first extension portion 11 and the second extension portion 12 in the transverse direction are both less than a minimum width of the body portion 15 in the transverse direction, the bending rigidity of the first extension portion 11 in the vertical direction is less than the body portion 15, the variation of the first extension portion 11 in the vertical direction is greater than the variation of the body portion 15, the distal end of the first extension portion 11 is inclined facing away from and away from the outer wall 192 relative to the proximal end, and the direction of the pressure F1 does not pass through the centroid of the first extension portion 11. Therefore, the pressure F1 causes the first extension portion 11 to deform downward by a certain angle, the overall effect of which is to reduce the height of the seal in the vertical direction.

Figure 7A:
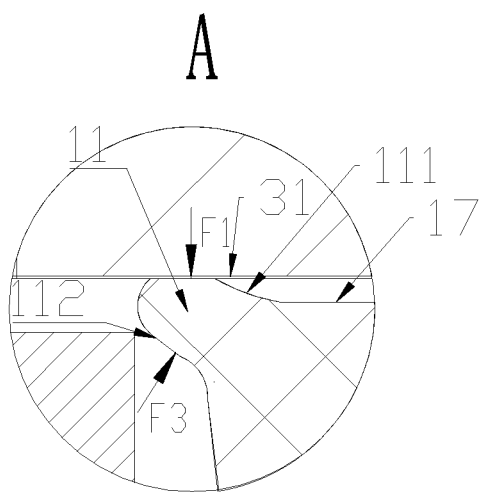
FIG. 7a is a partially schematic enlarged view of the seal, the first body element and the second body element shown in FIG. 7.

As shown in FIG. 7 and FIG. 7a, the first inner wall 191 is arranged toward the opening portion 23, the outer side surface 112 of the first extension portion 11 bears the resultant force F3 of the pressure inside the flow passage corresponding to the opening portion 23. Since the first extension portion 11 is strip-shaped, after the seal 1 is mounted, an area facing the second mounting surface portion 31 is less than an area away to the second mounting surface portion 31 in a projection of the outer side surface 112 of the first extension portion 11 in the direction perpendicular to the mounting surface 24. The resultant force F includes a component force toward the second mounting surface portion 31 perpendicularly. If the fluid pressure in the flow passage increases, the resultant force F3 of the fluid pressure on the outer side surface 112 may increase. The direction of the resultant force F3 is different from the direction of the pressure F1. The component force toward the second mounting surface portion 31 increases, so that the first extension portion 11 has greater pressure on the second mounting surface portion 31, thereby improving the sealing effect of the first extension portion 11. In addition to the deformation of the extension portion caused by the pre-pressure, the fluid pressure may also cause the deformation of the extension portion. In addition, within a specific fluid pressure range, the greater the fluid pressure in the flow passage is, the better the sealing effect is. The fluid may be gaseous, liquid or gas-liquid mixture.

Figure 7B:
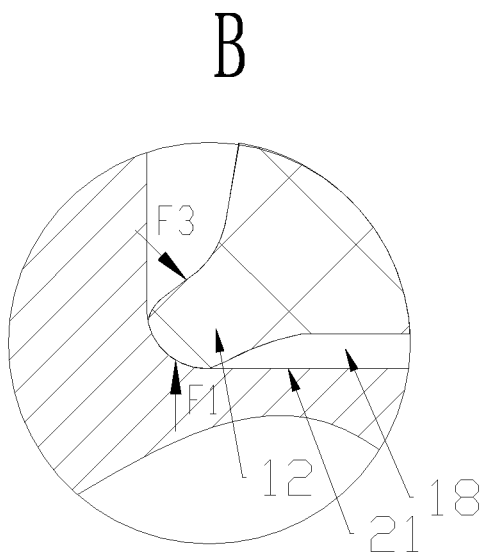
FIG. 7b is a partially schematic enlarged view of the seal, the first body element and the second body element shown in FIG. 7.

Similarly, as shown in FIG. 7b, the second extension portion 12 also has an inner side surface and an outer side surface, which are respectively arranged on two transverse sides of the second extension portion 12, and the outer side surface of the second extension portion 12 is part of the first inner wall 191. A distal end, away from the body portion 15, of the second extension portion 12 is arc-shaped. The boundary between the inner side surface and the outer side surface of the second extension portion 12 is the distal end of the second extension portion 12 in the vertical direction.

A thickness of the distal end, away from the body portion 15, of the second extension portion 12 is less than a thickness of a proximal end, close to the body portion 15, of the second extension portion 12. The bottom wall surface of the accommodating groove 21 is perpendicular to the vertical direction of the seal 1. Since the second extension portion 12 is strip-shaped, an area facing the bottom wall surface is less than an area away from the bottom wall surface in a projection of the outer side surface of the second extension portion 12 in a direction parallel to the bottom wall surface. The outer side surface of the second extension portion 12 bears the resultant force F3 of the fluid pressure in the flow passage. If the liquid pressure in the flow passage increases, the resultant force F3 of the liquid pressure on the outer side surface may increase, and the direction of the resultant force F3 is different from the direction of the pressure F1. The component force toward the bottom wall surface of the accommodating groove 21 increases, which increases the pressure of the second extension portion 12 on the bottom wall surface of the accommodating groove 21, thereby improving the sealing effect of the second extension portion 12. In addition to the deformation of the extension portion caused by the pre-pressure, the fluid pressure may also cause the deformation of the extension portion. In addition, in a specific fluid pressure range, the greater the liquid pressure in the flow passage is, the better the sealing effect is.

The distal end, away from the body portion 15, of the first extension portion 11 is arc-shaped, so that the contact area between the first extension portion 11 and the second mounting surface portion 31 is small just when the first extension portion 11 is compressed by the second mounting surface portion 31, and the distal end of the first extension portion 11 is easy to slide in the transverse direction, which can reduce the risk that at least part of the first extension portion 11 bends toward the outer wall 192 after mounting, thereby reducing the risk of sealing failure.

As shown in FIG. 2, the distal end of the inner side surface 111 of the first extension portion 11 is inclined toward the first inner wall 191 in the transverse direction relative to the proximal end, so that the distal end of the first extension portion 11 is easier to bend away from the outer wall 192 during the compression of the seal 1, which can reduce risk that at least part of the first extension portion 11 bends toward the outer wall 192 after mounting, thereby reducing the risk of sealing failure. A thickness of the distal end, away from the body portion 15, of the first extension portion 11 is less than a thickness of the proximal end, close to the body portion 15, of the first extension portion 11, so that the distal end of the first extension portion 11 is easier to bend toward the first inner wall 191, thereby reducing the risk of sealing failure. An overall shape of the first extension portion 11 may be substantially conical, and the structure of the second extension portion 12 is similar to the structure of the first extension portion 11, which is not described in detail herein. In this embodiment, an included angle α between two opposite surfaces of the first extension portion 11 and the third extension portion 13 ranges from 40° to 100°, such as 40°, 60°, 80° or 100°. The second extension portion 12 and the fourth extension portion 14 may also have similar shape arrangement and angle arrangement, which is not described in detail herein.

As shown in FIG. 2, in this embodiment, the first extension portion 11 and the second extension portion 12 are symmetrically arranged in the transverse direction. A portion, in the body portion 15, of the first inner wall 191 is in a shape of an arc which is recessed toward the outer wall 192, specifically a circular arc, or may be in other shape which is recessed toward the outer wall 192, such as a triangle or a trapezoid which is recessed toward the outer wall. Such arrangement can facilitate the bending of the first extension portion 11 and the second extension portion 12.

As shown in FIG. 2, in this embodiment, a height of the third extension portion 13 in the vertical direction is the same as a height of the first extension portion 11 in the vertical direction, and a height of the fourth extension portion 14 in the vertical direction is the same as a height of the second extension portion 12 in the vertical direction. The first extension portion 11 and the third extension portion 13 are symmetrically arranged in the vertical direction, and the second extension portion 12 and the fourth extension portion 14 are symmetrically arranged in the vertical direction, so that the force applying to the seal 1 in the vertical direction is relatively uniform. A cross section of the first groove 17 and a cross section of the second groove 18 are trapezoidal or triangular, which are recessed toward the body portion 15. In other embodiments, the cross section of the first groove 17 and the cross section of the second groove 18 may be substantially circular arc-shaped or triangular.

Figure 6:
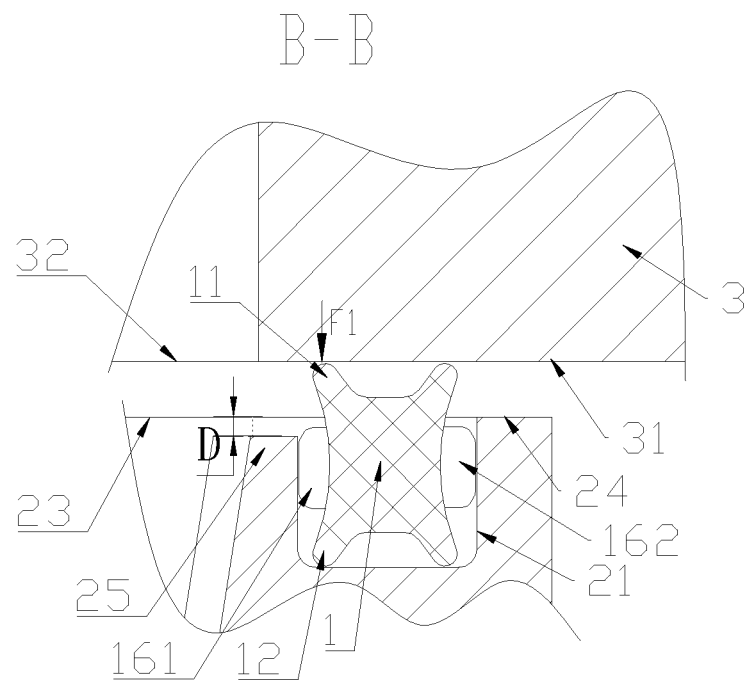
FIG. 6 is a partially schematic cross-sectional view of the seal, the second body element and the first body element shown in FIG. 3 in an uncompressed state taken along line B-B.

As shown in FIG. 2 and FIG. 6, the seal 1 in this embodiment may include at least two first protruding portions 161 which protrude transversely from the first inner wall 191, and a distal end of each first protruding portion 161 in the transverse direction extends beyond a distal end of the first extension portion 11 in the transverse direction. With a symmetry axis X-X in the vertical direction of the seal 1 as the reference line, a length s1 from the distal end of the first protruding portion 161 in the transverse direction to the symmetry axis X-X is greater than a length s2 from the distal end of the first extension portion 11 in the transverse direction to the symmetry axis X-X. Therefore, when at least part of the seal 1 is accommodated in the accommodating groove 21, the distal end of the first extension portion 11 in the transverse direction is separated from the inner side wall of the accommodating groove 21. In addition, in case that the first mounting surface portion approaches to or is separated from the second mounting surface portion 31, the first extension portion 11 is still within the range of the accommodating groove 21, so as to prevent the first extension portion 11 from being clamped between the mounting surface 24 and the second mounting surface portion 31, thereby reducing the risk of damage of the first extension portion 11.

Figure 5:
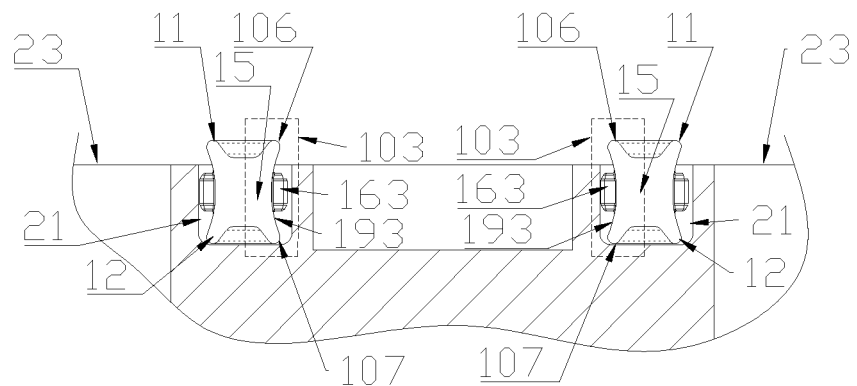
FIG. 5 a partially schematic cross-sectional view of the seal and the first body element shown in FIG. 3 taken along line E-E.

Similarly, the seal 1 further includes at least two second protruding portions 162 which protrude transversely from the outer wall 192, and a distal end of each second protruding portion 162 in the transverse direction extends beyond a distal end of the third extension portion 13 in the transverse direction. When part of the seal 1 is accommodated in the accommodating groove 21, the first protruding portions 161 and the second protruding portions 162 are in interference fit with the inner side wall of the accommodating groove 21, so that the seal 1 is position-limited in the accommodating groove 21, and the seal 1 may not be separated from the accommodating groove 21 during mounting. As shown in FIG. 1 and FIG. 5, the seal further includes third sealing portions 103, where each third sealing portion 103 includes fifth extension portions 106 and sixth extension portions 107, and the fifth extension portions 106 and the sixth extension portions 107 are located on opposite sides of the body portion 15. The fifth extension portions 106 are located between two adjacent first through holes 104 of the seal 1, and the fifth extension portions 106 are located between the first extension portions 11 corresponding to the two adjacent first through holes 104. A first groove 17 is formed between the fifth extension portion 106 and the first extension portion 11. The sixth extension portion 107 is located between two adjacent first through holes 104 of the seal 1, the sixth extension portion 107 is located between the second extension portions 12 corresponding to the two adjacent first through holes 104, and a second groove 18 is formed between the fifth extension portion 106 and the second extension portion 12. The fifth extension portion 106 and the sixth extension portion 107 enables a better sealing effect between two adjacent first through holes 104.

Figure 3:
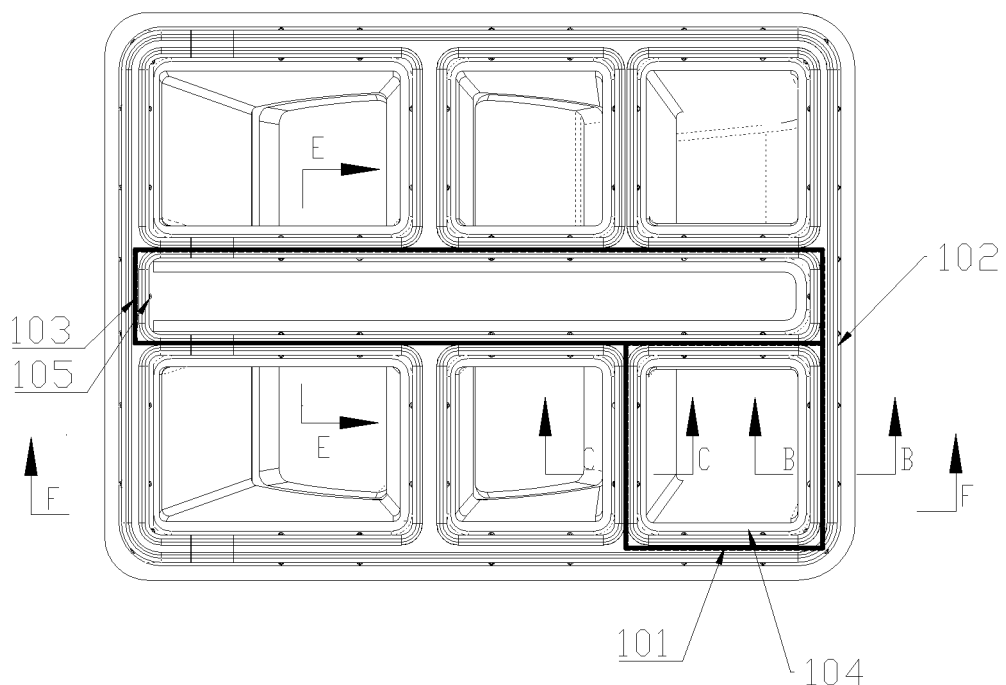
FIG. 3 is a schematic front view of a combined structure of the seal and the first body element according to the present disclosure.
Figure 4:
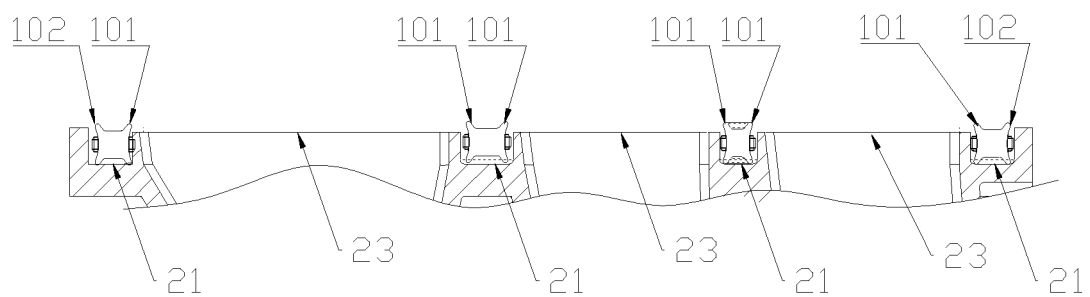
FIG. 4 is a partially schematic cross-sectional view of the seal and the first body element shown in FIG. 3 taken along line F-F.

As shown in FIG. 3 to FIG. 5, the seal 1 further includes second through holes 105, the fifth extension portion 106 surrounds and forms part of the second through hole 105, the sixth extension portion 107 surrounds and forms part of the second through hole 105, the fifth extension portion 106 and the sixth extension portion 107 extend from the body portion 15 toward the second through hole 105, and a second inner wall 193 corresponding to each second through hole 105 is formed in the seal 1. When the distance between the two first through holes 104 is large, providing the second through-hole 105 between the two first through-holes 104 can save the material of the seal 1, reduce the weight, and facilitate the position limiting to the seal 1. The seal 1 further includes at least two third protruding portions 163 which protrude transversely from the second inner wall 193, and a distal end of each third protruding portion 163 in the transverse direction extends beyond a distal end of the fifth extension portion 106 in the transverse direction. The third protruding portions 163 are in interference fit with the inner side wall of the accommodating groove 21, so that a position of the seal 1 is limited in the accommodating groove 21.

Figure 8:
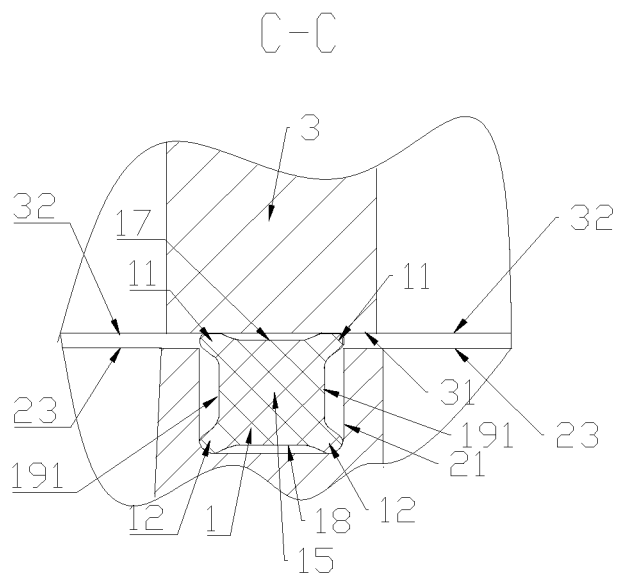
FIG. 8 is a partially schematic cross-sectional view of the seal, the first body element and the second body element shown in FIG. 3 in the mounted state taken along line C-C.

As shown in FIG. 1, FIG. 3 and FIG. 8, the seal 1 includes the first sealing portions 101 corresponding to the first through holes 104, and part of the seal 1 is located between two adjacent first through holes 104. The first extension portion 11 of one first sealing portion 101 and the first extension portion 11 of the other first sealing portion 101 are located on the same vertical side of the body portion 15, and a first groove 17 is formed between the two first extension portions 101. The second extension portion 12 of one first sealing portion 101 and the second extension portion 12 of the other first sealing portion 101 are located on the same vertical side of the body portion 15, and a second groove 18 which is recessed toward the body portion 15 is formed between the second extension portion 12 and the fourth extension portion 14, and a first groove 18 is formed between the two second extension portions 12. Therefore, both sides of the seal 1 can be subject to the pressure of the fluid in the flow passage. The seal 1 can perform a better function of sealing no matter which side is subject to a higher fluid pressure in the flow passage, so that the sealing effect between adjacent through holes is better.

As shown in FIG. 1 to FIG. 1 to FIG. 3, the first body element 2 includes six opening portions 23, the seal 1 includes six first through holes 104 and six first sealing portions 101 corresponding to the six first through holes 104, the second body element 3 includes six interface portions 32, the opening portions 23, the first sealing portions 101 and the interface portions 32 are arranged correspondingly. Three first sealing portions 101 are arranged in a row side in sequence, corresponding to the three opening portions 23 in sequence, and further corresponding to the three interface portions 32 in sequence. The body portions 15 of the adjacent first sealing portions 101 can be connected with each other. The opening portions 23 are separated from each other in fluid-sealing. At least two first sealing portions 101 are integrally injection-molded, which facilitates of manufacturing, saves materials, and reduces the mounting processes during mounting. In this embodiment, the six first sealing portions 101 are arranged in two rows, and each row has three first sealing portions 101. In other embodiments, the seal 1 may have eight first sealing portions 101, the eight first sealing portions 101 are arranged in two rows, and each row has four first sealing portions 101. Alternatively, at least two first sealing portions 101 are provided, which are arranged in other ways.

The first body element 2 may have more than one opening portion 23, or at least two such as two, three, four, five, six, seven, eight or nine. The number of the first sealing portion 101 corresponding to each opening portion 23 is more than one, such as two, three, four, five, six, seven, eight or nine. The number of the interface portion corresponding to each opening portion 232 may be at least two. In this embodiment, the number of the opening portion 23, the number of the interface portion 32, and the number of the first sealing portion 101 are all the same, so that each opening portion 23 is sealingly separated from other opening portion 23 after mounting. In other embodiments, the number of the opening portion 23, the number of the interface portion 32, and the number of the first sealing portion 101 may be different from each other.

As shown in FIG. 4 to FIG. 6, the mounting surface 24 of the first body element 2 corresponds to the second mounting surface portion 31 of the second body element 3. The accommodating groove 21 surrounds the opening portion 23 and is spaced apart with the respective opening portion 23. The first body element 2 has an inner side flange 25 which protrudes from the bottom of the accommodating groove 21, and the inner side flange 25 can limit the position of the seal 1. The inner side flange 25 surrounds the single opening portion 23 and is closer to the single opening portion 23 than the accommodating groove 21, and a gap is formed between a top end of the inner side flange 25 and a plane where the mounting surface 24 is located, that is, a gap D is formed between the top end of the inner side flange 25 and the plane where the mounting surface 24 is located, which can reduce the requirements for the manufacturing tolerance of the first body element 2, thereby reducing the manufacturing cost. If the inner side flange 25 is slightly higher than the mounting face 24 due to the manufacturing tolerance, it may cause problems when the mounting surface 24 and the second mounting face 31 need to be closely fitted, thus weakening the sealing effect. In addition, as shown in FIG. 6, since the gap is formed between the top end of the inner side flange 25 and the plane where the mounting surface 24 is located, the fluid pressure in the flow passage corresponding to the opening portion 23 can be transferred into the accommodating groove 21 through the gap.

Figure 9:
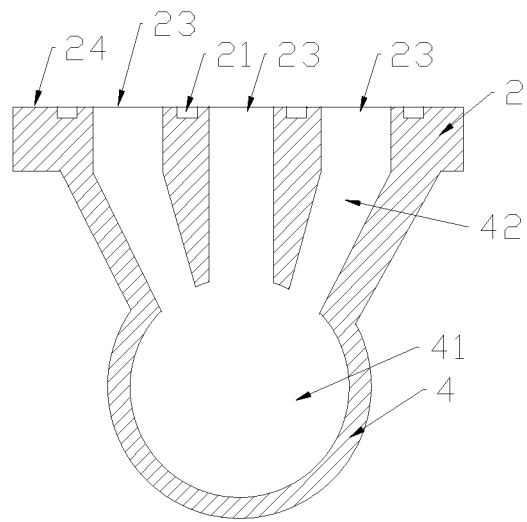
FIG. 9 is a schematic cross-sectional view of a housing according to an embodiment of the present disclosure.
Figure 10:
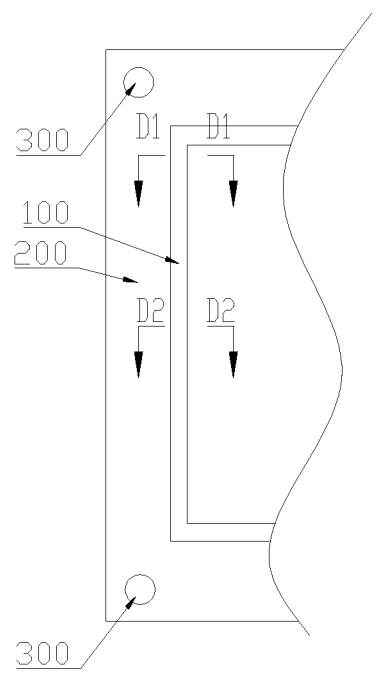
FIG. 10 is a schematic front view of the seal and a mounting surface.
Figure 11:
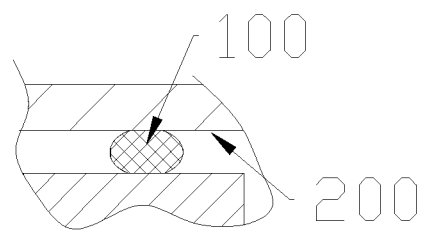
FIG. 11 is a partially schematic cross-sectional view of the seal and the mounting surface shown in FIG. 10 taken along line D1-D1.
Figure 12:
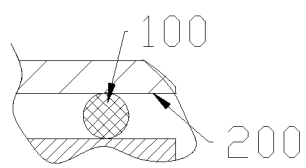
FIG. 12 is a partially schematic cross-sectional view of the seal and the mounting surface shown in FIG. 10 taken along line D2-D2.

FIG. 9 shows a part of a fluid device, the fluid device may be a valve, the valve includes a housing 4 and an inner cavity 41 which is located in the housing 4. The housing 4 further has a first body element 2. The housing further includes multiple passages 42 and the accommodating grooves 21 which surround the passages 42, one end of each passage 42 is connected with one opening portion 23, the other end of each passage 42 is connected with the inner cavity 41, and the opening portion 23 is in communication with the inner cavity 41 through the corresponding passage 42. At least part of the opening portions 23 of the valve can be connected to other parts of a fluid control system through the first body element 2, so that the mounting steps can be relatively simplified, the leakage points of the connecting parts can be reduced, and the sealing reliability can be improved. The fluid device is not limited to valve, but may be other devices used in the fluid control system, such as a pump or a heat exchanger, or may be integrated assemblies with multiple functions, such as an integrated assembly of the heat exchanger and the valve, an integrated assembly of the valve and the pump, and an integrated assembly of the pump and the heat exchanger, which can improve the sealing effect.

As shown in FIG. 1, a fluid assembly is further provided according to the embodiment of the present disclosure, which can include the above fluid device and the seal 1, and the fluid assembly further includes a second body element 3. The first body element 2 may be a part of the above valve or other fluid device, and the second body element 3 may be a part of another fluid device. This fluid assembly is not limited to a valve with at least two external interfaces, but can be applied to other fluid control assembly or integrated assembly with at least two external interfaces or an external interface with a greater mounting surface, such as an integrated assembly of the heat exchanger and the valve, an integrated assembly of the valve and the pump, and an integrated assembly of the pump and the heat exchanger, which can improve the sealing effect.

The above embodiments are only used to illustrate the present disclosure rather than limit the technical solutions described in the present disclosure. For example, the definition of directionality such as "front", "back", "left", "right", "up" and "down". Although the present disclosure is described in detail in this specification with reference to the above embodiments, those of ordinary skill in the art should understand that those skilled in the art may still combine, modify or equivalently replace the present disclosure, and all technical solutions and improvements thereof that do not depart from the spirit and scope of the present disclosure shall be covered within the scope of the claims of the present disclosure.

The invention claimed is:

1. A seal, comprising a body portion, wherein first through holes are formed in the seal, wherein the seal further has a first sealing portion corresponding to each first through hole, at least two first through holes are provided, and the at least two first through holes have the corresponding first sealing portions; each first sealing portion comprises a first extension portion and a second extension portion, the first extension portion and the second extension portion extend from the body portion toward the corresponding first through hole, and a distance between the first extension portion and the second extension portion is greater than a height of the body portion in a vertical direction; along the height of the body portion in the vertical direction, the first extension portion forms a closed protruding structure around the first through hole at one end of the first through hole, and the second extension portion forms a closed protruding structure around the first through hole at an other end of the first through hole, wherein the seal further comprises a third sealing portion, the third sealing portion comprises a fifth extension portion and a sixth extension portion, the fifth extension portion and the sixth extension portion are located on two opposite sides of the body portion, the fifth extension portion and the sixth extension portion extend away from the body portion, wherein the fifth extension portion is located between two adjacent first through holes of the seal, the fifth extension portion is located between the first extension portions of the two adjacent first through holes, and a first groove is formed between the fifth extension portion and the first extension portion; the sixth extension portion is located between two adjacent first through holes of the seal, the sixth extension portion is located between the second extension portions of the two adjacent first through holes, and a second groove is formed between the fifth extension portion and the first extension portion, and/or, the seal further comprises second through holes, the fifth extension portion surrounds and forms part of the second through hole, the sixth extension portion surrounds and forms part of the second through hole, the fifth extension portion and the sixth extension portion extend from the body portion toward the second through hole, and a second inner wall corresponding to each second through hole is formed in the seal; the seal further comprises at least two third protruding portions which protrude transversely from the second inner wall, and a distal end of each third protruding portion in a transverse direction extends beyond a distal end of the fifth extension portion in the transverse direction.

2. The seal according to claim 1, wherein a first inner wall corresponding to each first through hole is formed in the seal, wherein, the first extension portion has an inner side surface and an outer side surface which are respectively arranged on two transverse sides of the first extension portion, the outer side surface of the first extension portion is part of the first inner wall; a distal end, away from the body portion, of the first extension portion is arc-shape; and a thickness of the distal end, away from the body portion, of the first extension portion is less than a thickness of a proximal end, close to the body portion, of the first extension portion, and/or, the second extension portion has an inner side surface and an outer side surface which are respectively arranged on two transverse sides of the second extension portion, the outer side surface of the second extension portion is part of the first inner wall; a distal end away from the body portion, of the second extension portion is arc-shaped; and a thickness of the distal end, away from the body portion, of the second extension portion is less than a thickness of a proximal end, close to the body portion, of the second extension portion.

3. The seal according to claim 2, wherein the seal further comprises an outer wall which is transversely opposite to the first inner wall, the first extension portion and the second extension portion are symmetrically arranged in a transverse direction; a portion, close to a symmetry axis, of the first inner wall is recessed toward the outer wall, and a portion, in the body portion, of the first inner wall is arc-shaped; and the seal is made of an organic polymer material by injection-mold.

4. The seal according to claim 1, wherein maximum widths of both the first extension portion and the second extension portion in a transverse direction are less than a minimum width of the body portion in the transverse direction, a length of a cross section of the first extension portion is more than 1.4 times an average thickness of the cross section of the first extension section, and a length of a cross section of the second extension portion is more than 1.4 times an average thickness of the cross section of the second extension portion.

5. The seal according to claim 1, wherein the seal further comprises second sealing portions on an outer circumferential side of the seal, each second sealing portion comprises a third extension portion and a fourth extension portion, the third extension portion and the fourth extension portion are located on two opposite sides of the body portion, the third extension portion and the fourth extension portion extend from the body portion and away from the body portion, and a distance between the third extension portion and the fourth extension portion is greater than the height of the body portion in the vertical direction; and a distance between the first extension portion and the third extension portion is greater than a width of the body portion in a transverse direction.

6. The seal according to claim 5, wherein the first extension portion and the third extension portion are located on a same vertical side of the body portion, and a first groove is formed between the first extension portion and the third extension portion; the second extension portion and the fourth extension portion are located on a same vertical side of the body portion, a second groove which is recessed into the body portion is formed between the second extension portion and the fourth extension portion, and an included angle formed between the first extension portion and the third extension portion ranges from 40° to 100°.

7. The seal according to claim 5, wherein the seal further comprises a first inner wall and an outer wall which are transversely opposite to each other, the seal further comprises at least two first protruding portions which protrude transversely from the first inner wall, and a distal end of each first protruding portion in the transverse direction extends beyond a distal end of the first extension portion in the transverse direction;

and/or, the seal further comprises at least two second protruding portions which protrude transversely from the outer wall, a distal end of each second protruding portion in the transverse direction extends beyond a distal end of the third extension portion in the transverse direction; the seal is made of one or a combination of Ethylene-Propylene-Diene Monomer, silicone rubber and poly tetra fluoroethylene.

8. The seal according to claim 6, wherein a height of the third extension portion in the vertical direction is the same as a height of the first extension portion in the vertical direction, a height of the fourth extension portion in the vertical direction is the same as a height of the second extension portion in the vertical direction, the first extension portion and the third extension portion are symmetrically arranged in the vertical direction, and the second extension portion and the fourth extension portion are symmetrically arranged in the vertical direction; and a cross section of the first groove and a cross section of the second groove are trapezoidal or triangular.

9. The seal according to claim 1, wherein part of the seal is located between two adjacent ones of the first through holes, the first extension portion of one of the first sealing portions and the first extension portion of an other one of the first sealing portions are located on a same vertical side of the body portion, a first groove is formed between the two first extension portions; the second extension portion of one first sealing portion and the second extension portion of the other first sealing portion are located on a same vertical side of the body portion, and a second groove which is recessed toward the body portion is formed between the two second extension portions.

10. A fluid device, comprising a housing, wherein the housing comprises a first body element, the housing has at least two passages and accommodating grooves which surround the at least two passages, and the seal according to claim 1 is provided in the accommodating grooves; and the first sealing portion surrounds the corresponding passage.

11. The fluid device according to claim 10, wherein the first body element has a first mounting surface portion, the first mounting surface portion has a mounting surface, the first body element comprises a plurality of opening portions, and the accommodating grooves are recessed in the mounting surface and surround the respective opening portion;

the fluid device further has an inner cavity, one end of each passage is connected with one opening portion, an other end of each passage is connected with the inner cavity, and one opening portion is in communication with the inner cavity through the corresponding passage;

the first body element is plate-shaped, the first body element has at least two first mounting holes which extends through the first body element along a thickness direction of the first body element, and the at least two first mounting holes are located close to an edge of the mounting surface;

a gap is formed between the accommodating groove and the respective opening portion, the first body element has an inner side flange which protrudes from the bottom of the accommodating groove, the inner side flange surrounds the respective opening portion and is closer to the single opening portion than the accommodating groove; and a gap is formed between a top end of the inner side flange and a plane where the mounting surface is located.

12. A fluid assembly, comprising a fluid device and a second body element, wherein the fluid device comprises a housing; wherein the housing comprises a first body element, the housing has passages and accommodating grooves which surround the passages, and the seal according to claim 1 is provided in the accommodating grooves;

the at least two through holes of the seal correspond to the at least two passages, and the first sealing portion surrounds the corresponding passage;

the first body element is fixed to the second body element, and the first body element and the second body element compress the seal tightly.

13. The fluid assembly according to claim 12, wherein in a case that the seal is in an uncompressed state in the vertical direction before the first body element is fixed to the second body element, a height of the first extension portion in the vertical direction is h11, a height of the second extension portion in the vertical direction is h2, and an overall height of the seal in the vertical direction is a; in a case that the seal is in a state where the first body element is fixed to the second body element, the overall height of the seal in the vertical direction is b; and h1+h2≥a−b, and a value of (a−b)/a ranges from 0.25 to 0.40.

14. The fluid assembly according to claim 12, wherein the first body element has a first mounting surface portion, the first mounting surface portion has a mounting surface, the first body element comprises at least two of opening portions, and the accommodating grooves are recessed in the mounting surface and surround the respective opening portion; the second body element corresponds to the first body element, the second body element has a second mounting surface portion, the second body element comprises at least two interface portions, the at least two interface portions correspond to the at least two opening portions; one end of each passage is connected with one opening portion;

the first body element is plate-shaped, the first body element has at least two first mounting holes which extend through the first body element along a thickness direction of the first body element, and the at least two first mounting holes are located close to an edge of the mounting surface; the second body element has second mounting holes corresponding to the at least two first mounting holes;

a gap is formed between the accommodating groove and the respective opening portion, the first body element has an inner side flange which protrudes from the bottom of the accommodating groove, the inner side flange surrounds the respective opening portion and is closer to the single opening portion than the accommodating groove; and a gap is formed between a top end of the inner side flange and a plane where the mounting surface is located.

15. The seal according to claim 2, wherein the seal further comprises second sealing portions on an outer circumferential side of the seal, each second sealing portion comprises a third extension portion and a fourth extension portion, the third extension portion and the fourth extension portion are located on two opposite sides of the body portion, the third extension portion and the fourth extension portion extend from the body portion and away from the body portion, and a distance between the third extension portion and the fourth extension portion is greater than the height of the body portion in the vertical direction; and a distance between the first extension portion and the third extension portion is greater than a width of the body portion in a transverse direction.

16. The seal according to claim 4, wherein the seal further comprises second sealing portions on an outer circumferential side of the seal, each second sealing portion comprises a third extension portion and a fourth extension portion, the third extension portion and the fourth extension portion are located on two opposite sides of the body portion, the third extension portion and the fourth extension portion extend from the body portion and away from the body portion, and a distance between the third extension portion and the fourth extension portion is greater than the height of the body portion in the vertical direction; and a distance between the first extension portion and the third extension portion is greater than a width of the body portion in a transverse direction.

17. The seal according to claim 2, wherein part of the seal is located between two adjacent first through holes, the first extension portion of one first sealing portion and the first extension portion of the other first sealing portion are located on a same vertical side of the body portion, a first groove is formed between the two first extension portions; the second extension portion of one first sealing portion and the second extension portion of the other first sealing portion are located on a same vertical side of the body portion, and a second groove which is recessed toward the body portion is formed between the two second extension portions.

18. The seal according to claim 4, wherein part of the seal is located between two adjacent ones of the first through holes, the first extension portion of one of the first sealing portions and the first extension portion of an other one of the first sealing portions are located on a same vertical side of the body portion, a first groove is formed between the two first extension portions; the second extension portion of one first sealing portion and the second extension portion of the other first sealing portion are located on a same vertical side of the body portion, and a second groove which is recessed toward the body portion is formed between the two second extension portions.

* * * * *